United States Patent
Nagashima

(10) Patent No.: US 9,838,270 B2
(45) Date of Patent: Dec. 5, 2017

(54) MANAGEMENT APPARATUS AND MANAGEMENT METHOD FOR MANAGEMENT APPARATUS

(71) Applicant: CANON KABUSHIKI KAISHA, Tokyo (JP)

(72) Inventor: Takeyuki Nagashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 250 days.

(21) Appl. No.: 14/566,437

(22) Filed: Dec. 10, 2014

(65) Prior Publication Data

US 2015/0172133 A1   Jun. 18, 2015

(30) Foreign Application Priority Data

Dec. 12, 2013   (JP) .................................. 2013-257162

(51) Int. Cl.
*H04L 12/24* (2006.01)
*H04L 12/26* (2006.01)
*G06F 9/445* (2006.01)

(52) U.S. Cl.
CPC .......... *H04L 41/50* (2013.01); *G06F 9/44526* (2013.01); *H04L 43/0823* (2013.01); *H04L 41/0213* (2013.01)

(58) Field of Classification Search
None
See application file for complete search history.

(56) References Cited

U.S. PATENT DOCUMENTS

| 2006/0279773 A1* | 12/2006 | Sakurai | G06F 3/1222 358/1.15 |
| 2009/0070442 A1* | 3/2009 | Kacin | H04L 63/029 709/221 |
| 2013/0212591 A1* | 8/2013 | Fecioru | G06F 9/4881 718/103 |
| 2014/0331230 A1* | 11/2014 | Reinhardt | G06F 9/4843 718/102 |

FOREIGN PATENT DOCUMENTS

JP   2009-151467 A   7/2009

* cited by examiner

*Primary Examiner* — Angela Nguyen
(74) *Attorney, Agent, or Firm* — Canon U.S.A., Inc. IP Division

(57) ABSTRACT

A management apparatus for executing a management application for managing network devices on a network, configured to register, as a function of the plug-in for adding a service to the management application, remote tasks having different priorities in an execution waiting task queue according to the priorities, and to sequentially execute the first one of the remote tasks registered in the execution waiting task queue.

11 Claims, 18 Drawing Sheets

FIG.4

| DEVICE NAME | PRODUCT NAME | ADDRESS INFORMATION | OPERATING CONDITION | SUPPORTED SERVICES |
|---|---|---|---|---|
| DevA1 | DevA | IP_A1 | OPERATING | sPIA TO sPIX |
| DevA2 | DevA | IP_A2 | OPERATING | sPIA TO sPIX |
| : | : | : | : | : |
| DevAx | DevA | IP_Ax | OPERATING | sPIA TO sPIX |

FIG.5

| DEVICE NAME | PRODUCT NAME | ADDRESS INFORMATION | OPERATING CONDITION |
|---|---|---|---|
| DevA1 | DevA | IP_A1 | OPERATING |
| DevA2 | DevA | IP_A2 | OPERATING |
| ⋮ | ⋮ | ⋮ | ⋮ |
| DevAx | DevA | IP_Ax | OPERATING |

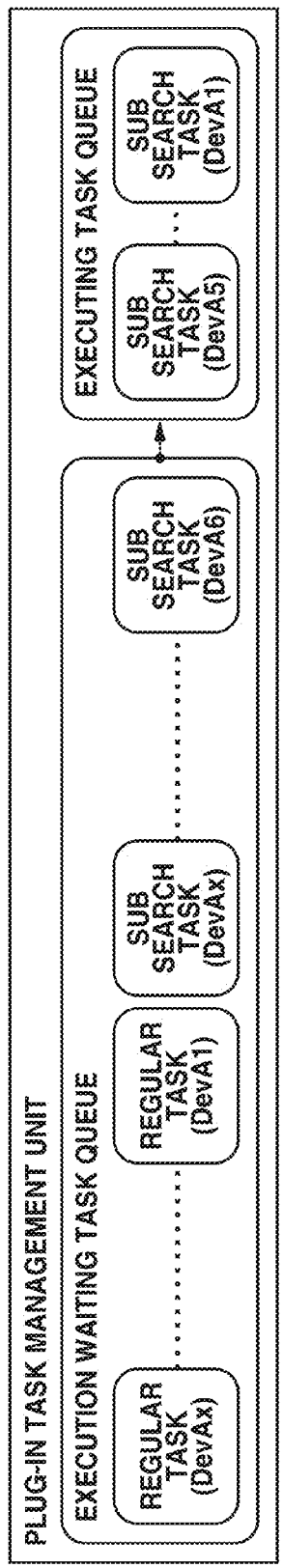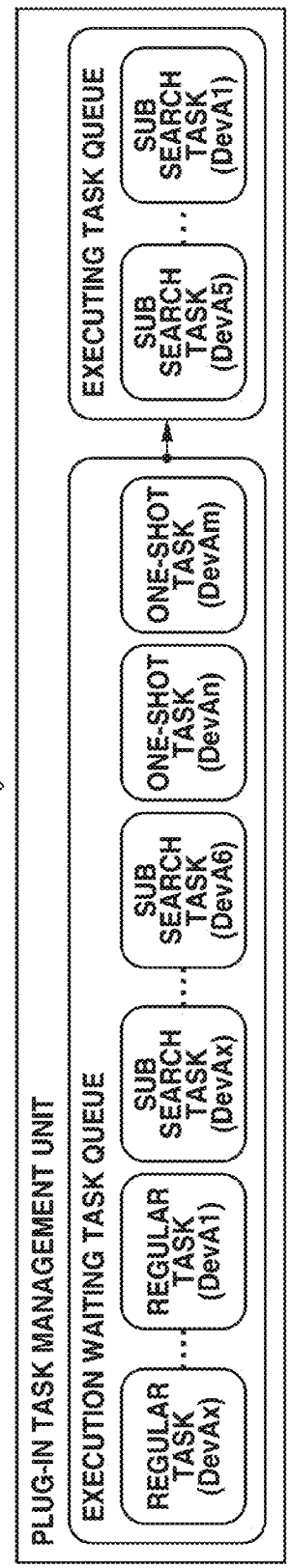

FIG.7

| | EXECUTION WAITING TASKS AND PRIORITIES OF THE EXECUTION WAITING TASKS | NEW TASK AND WAITING ORDER OF THE NEW TASK | | |
|---|---|---|---|---|
| | | TASK D (HIGH) | TASK E (MIDDLE) | TASK F (LOW) |
| (1) | TASK A: HIGH<br>TASK B: MIDDLE<br>TASK C: LOW | TASK A<br>TASK D<br>TASK B<br>TASK C | TASK A<br>TASK B<br>TASK E<br>TASK C | TASK A<br>TASK B<br>TASK C<br>TASK F |
| (2) | TASK A: HIGH<br>TASK B: MIDDLE | TASK A<br>TASK D<br>TASK B | TASK A<br>TASK B<br>TASK E | TASK A<br>TASK B<br>TASK F |
| (3) | TASK A: HIGH<br>TASK C: LOW | TASK A<br>TASK D<br>TASK C | TASK A<br>TASK E<br>TASK C | TASK A<br>TASK C<br>TASK F |
| (4) | TASK B: MIDDLE<br>TASK C: LOW | TASK D<br>TASK B<br>TASK C | TASK B<br>TASK E<br>TASK C | TASK B<br>TASK C<br>TASK F |
| (5) | TASK A: HIGH | TASK A<br>TASK D | TASK A<br>TASK E | TASK A<br>TASK F |
| (6) | TASK B: MIDDLE | TASK D<br>TASK B | TASK B<br>TASK E | TASK B<br>TASK F |
| (7) | TASK C: LOW | TASK D<br>TASK C | TASK E<br>TASK C | TASK C<br>TASK F |
| (8) | NO WAITING TASK | TASK D | TASK E | TASK F |

FIG.8A

| PLUG-IN NAME | VERSION | PLUG-IN STATUS |
|---|---|---|
| PLUG-IN A | v1.0.0 | OPERATING |
| PLUG-IN B | v2.1.0 | STOPPED |
| PLUG-IN C | v3.0.0 | OPERATING |
| ⋮ | ⋮ | ⋮ |
| PLUG-IN X | v1.1.0 | OPERATING |

FIG.8B

| PLUG-IN NAME | VERSION | PLUG-IN STATUS | DEVICE AUTHENTICATION |
|---|---|---|---|
| PLUG-IN A | v1.0.0 | OPERATING | PROVIDED |
| PLUG-IN B | v2.1.0 | STOPPED | NOT PROVIDED |
| PLUG-IN C | v3.0.0 | OPERATING | PROVIDED |
| ⋮ | ⋮ | ⋮ | ⋮ |
| PLUG-IN X | v1.1.0 | OPERATING | PROVIDED |

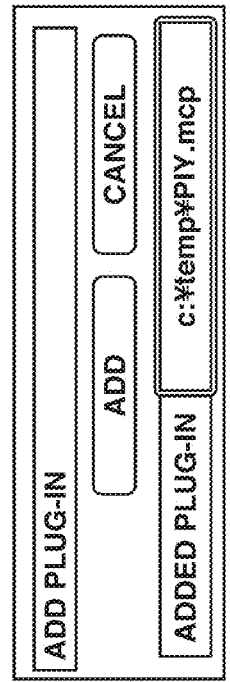
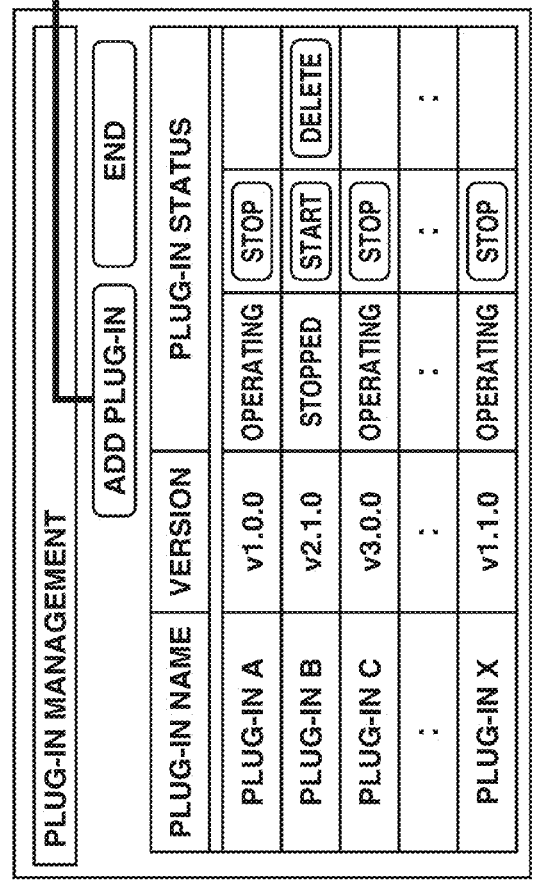

FIG.11

| DEVICE NAME | PRODUCT NAME | ADDRESS INFORMATION |
|---|---|---|
| DevA1 | DevA | IP_A1 |
| DevA2 | DevA | IP_A2 |
| : | : | : |
| DevAx | DevA | IP_Ax |

FIG.12

| SET DEVICE AUTHENTICATION INFORMATION | | | | | | | | |
|---|---|---|---|---|---|---|---|---|
| DEVICE INFORMATION | | | AUTHENTICATION INFORMATION | | | | AUTHENTICATION TEST | |
| DEVICE NAME | PRODUCT NAME | ADDRESS INFORMATION | AUTHENTICATION METHOD | DOMAIN NAME | USER NAME | PASSWORD | EXECUTE | RESULT |
| DevA1 | DevA | IP_A1 | DOMAIN AUTHENTICATION | DomainA | UserA1 | ••• | AUTHENTICATE | OK |
| DevA2 | DevA | IP_A2 | LOCAL DEVICE AUTHENTICATION | | UserA2 | ••• | AUTHENTICATE | OK |
| .. | .. | .. | .. | .. | .. | .. | .. | .. |
| DevAx | DevA | IP_Ax | LOCAL DEVICE AUTHENTICATION | | UserAx | ••• | AUTHENTICATE | OK |

UPDATE    CANCEL

FIG.13

| DEVICE NAME | PRODUCT NAME | AUTHENTICATION METHOD | DOMAIN NAME | USER NAME | PASSWORD |
|---|---|---|---|---|---|
| DevA1 | DevA | DOMAIN AUTHENTICATION (SSO) | DomainA | UserA1 | ••• |
| DevA2 | DevA | LOCAL DEVICE AUTHENTICATION (SDL) | n/a | UserA3 | ••• |
| ⋮ | ⋮ | ⋮ | ⋮ | ⋮ | ⋮ |
| DevAx | DevA | LOCAL DEVICE AUTHENTICATION (SDL) | n/a | UserA4 | ••• |

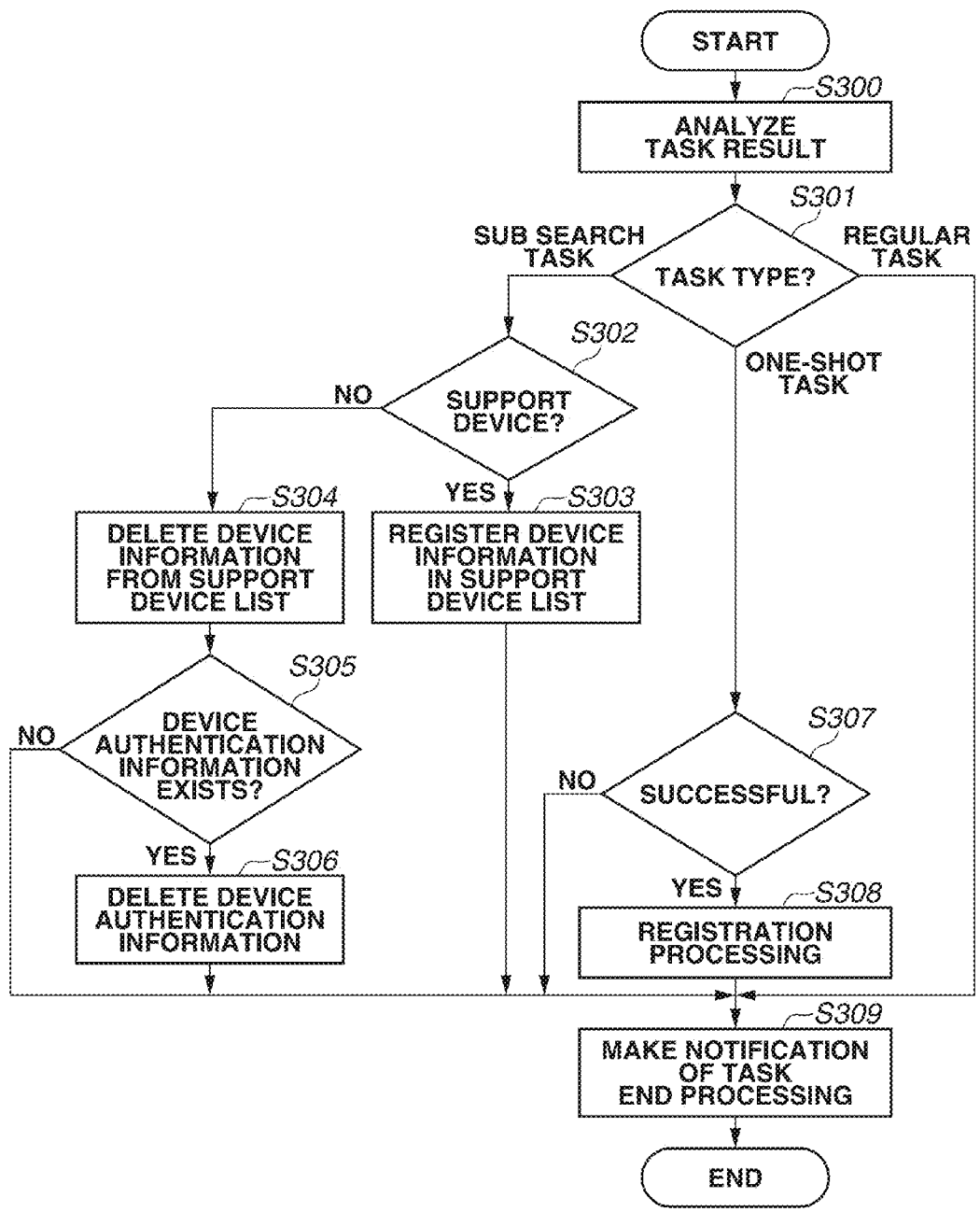

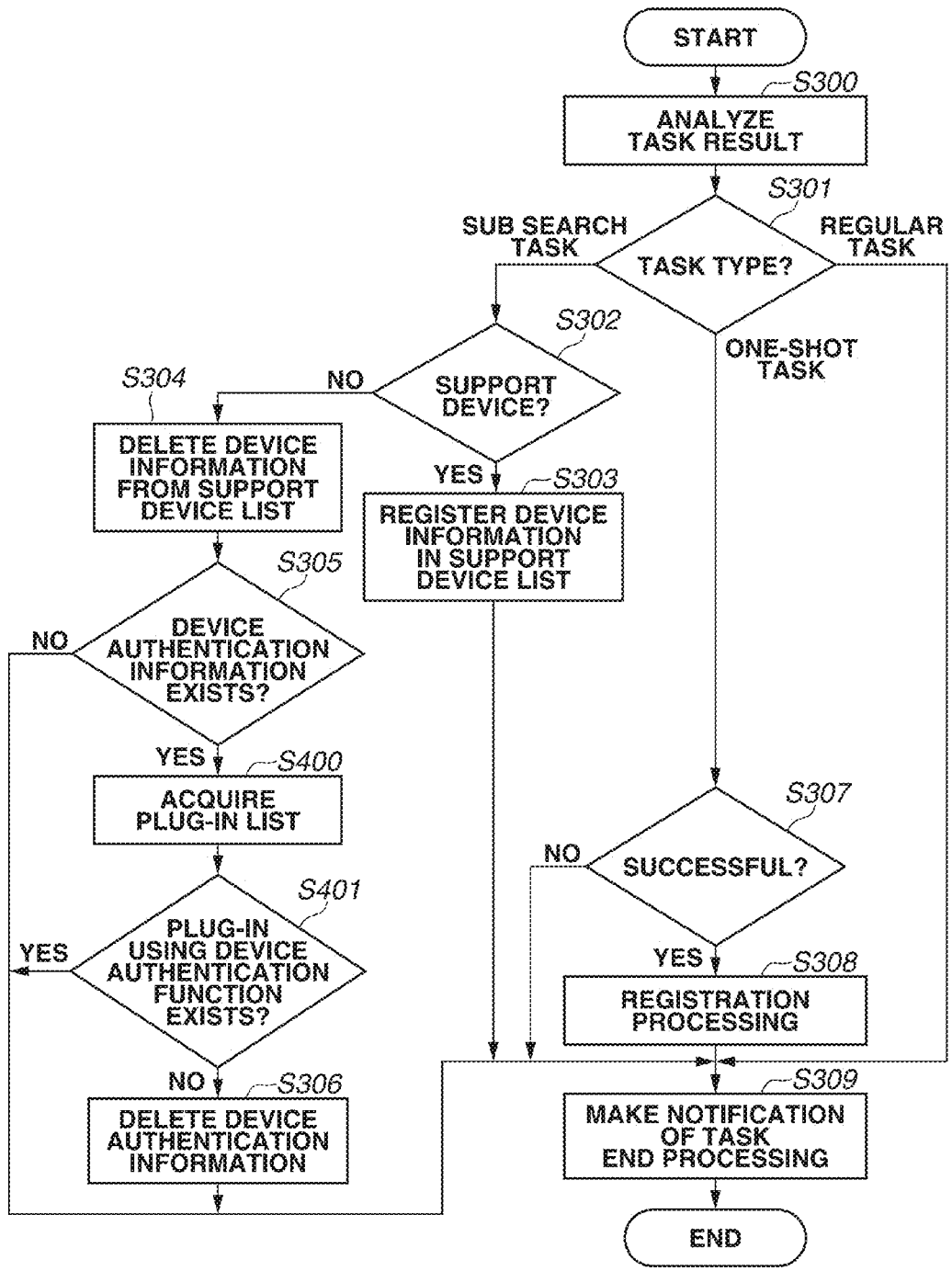

MANAGEMENT APPARATUS AND MANAGEMENT METHOD FOR MANAGEMENT APPARATUS

BACKGROUND OF THE INVENTION

Field of the Invention

The present invention relates to a management apparatus for managing network devices and a management method for the management apparatus.

Description of the Related Art

Conventionally, in a technical field related to network device management, to manage a plurality of network devices connected on an office network, a management apparatus executes various types of tasks on the plurality of network devices. Processing such as setting operations on network devices performed by the management apparatus via the network is referred to as remote tasks.

As a conventional technique, a web application server controls the order of print processing performed by a print server via a network as discussed in, for example, Japanese Patent Application Laid-Open No. 2009-151467). The web application server manages the progress status of print tasks on the print server by using a database, and performs task control such as changing the priorities of print tasks.

The management apparatus for managing network devices executes a device management application for achieving the management of network devices. The device management application is basically provided with a function of searching for network devices, and a function of acquiring their statuses. Further, to achieve detailed management, plug-ins (programs) for adding relevant management functions can be added.

SUMMARY OF THE INVENTION

The above-described conventional technique does not take into consideration about the task control in consideration of remote tasks executed in the background required to manage functions (services) added as plug-ins and remote tasks executed by the device management application. Therefore, the conventional technique does not suitably cope with effects of various changes, such as function additions by using plug-ins and an increase in the number of management target network devices, on normal task operations and user operability.

The present invention comprises a technique capable of achieving flexible task control for remote tasks in a device management application having a plug-in configuration.

According to an aspect of the present invention, a management apparatus configured to execute a management application for managing network devices on a network includes a first generation unit configured to generate, as a function of a plug-in for adding a service to the management application, a first task which is a remote task for determining whether the network devices support the service provided by the plug-in, a second generation unit configured to generate, as a function of the plug-in, a second task which is a remote task specified to be executed by a user operation performed via a management screen provided by the plug-in, and which is a remote task having a higher priority than the first task, a third generation unit configured to generate, as a function of the plug-in, a third task which is a remote task having a lower priority than the first task, a registration unit configured to register, in an execution waiting task queue, the remote tasks generated as a function of the plug-in by the first, the second, and the third generation units according to the priorities of the remote tasks, and an execution unit configured to sequentially execute, as a function of the plug-in, the first one of the remote tasks registered in the execution waiting task queue. When the second task is specified to be executed via the management screen provided by the plug-in, display control is performed to disable operations via the management screen since a time when the execution is specified by the user until a time when the second task is executed and the execution result is analyzed by the plug-in.

Further features of the present invention will become apparent from the following description of exemplary embodiments with reference to the attached drawings.

BRIEF DESCRIPTION OF THE DRAWINGS

FIG. 4 is a table illustrating an example of device information of network devices.

FIG. 5 is a table illustrating device information acquired from network devices by a device control unit 42.

FIGS. 6A and 6B illustrate an example of task execution control by a plug-in task management unit 52.

FIG. 7 is a table illustrating an example of queuing processing on an execution waiting task queue by the plug-in task management unit 52.

FIGS. 8A and 8B are tables illustrating plug-in lists.

FIGS. 10A and 10B illustrate examples of plug-in management screens.

FIG. 11 illustrates an example of a support device list referred to by a plug-in control unit 51.

FIG. 12 illustrates an example of a device authentication information setting screen.

FIG. 13 illustrates an example of a device authentication information list.

FIG. 17 is a flowchart illustrating details of task end processing performed by the plug-in task management unit 52 according to the first exemplary embodiment.

FIG. 18 is a flowchart illustrating details of task end processing performed by the plug-in task management unit 52 according to a second exemplary embodiment.

DESCRIPTION OF THE EMBODIMENTS

Figure 1:
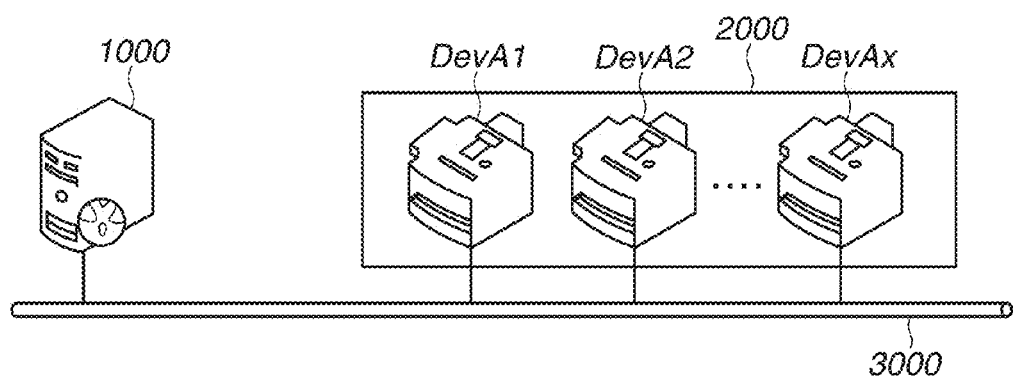
FIG. 1 illustrates an example of a network configuration according to an exemplary embodiment of the present invention.

FIG. 1 illustrates an example of a network configuration according to a first exemplary embodiment of the present invention. This network system includes a management apparatus 1000 and network devices 2000 (DevA1 to DevAx). The management apparatus 1000 and the network devices 2000 are connected with each other via a communication line 3000. The network devices 2000 include image formation apparatuses such as printers, copying machines, and scanners, and network connection apparatuses such as network cameras, mobile phones, and car navigation systems. The communication line 3000 achieves a wired or wireless network connection. The network connection is not limited to a local area network, and may be the Internet environment.

Figure 3:
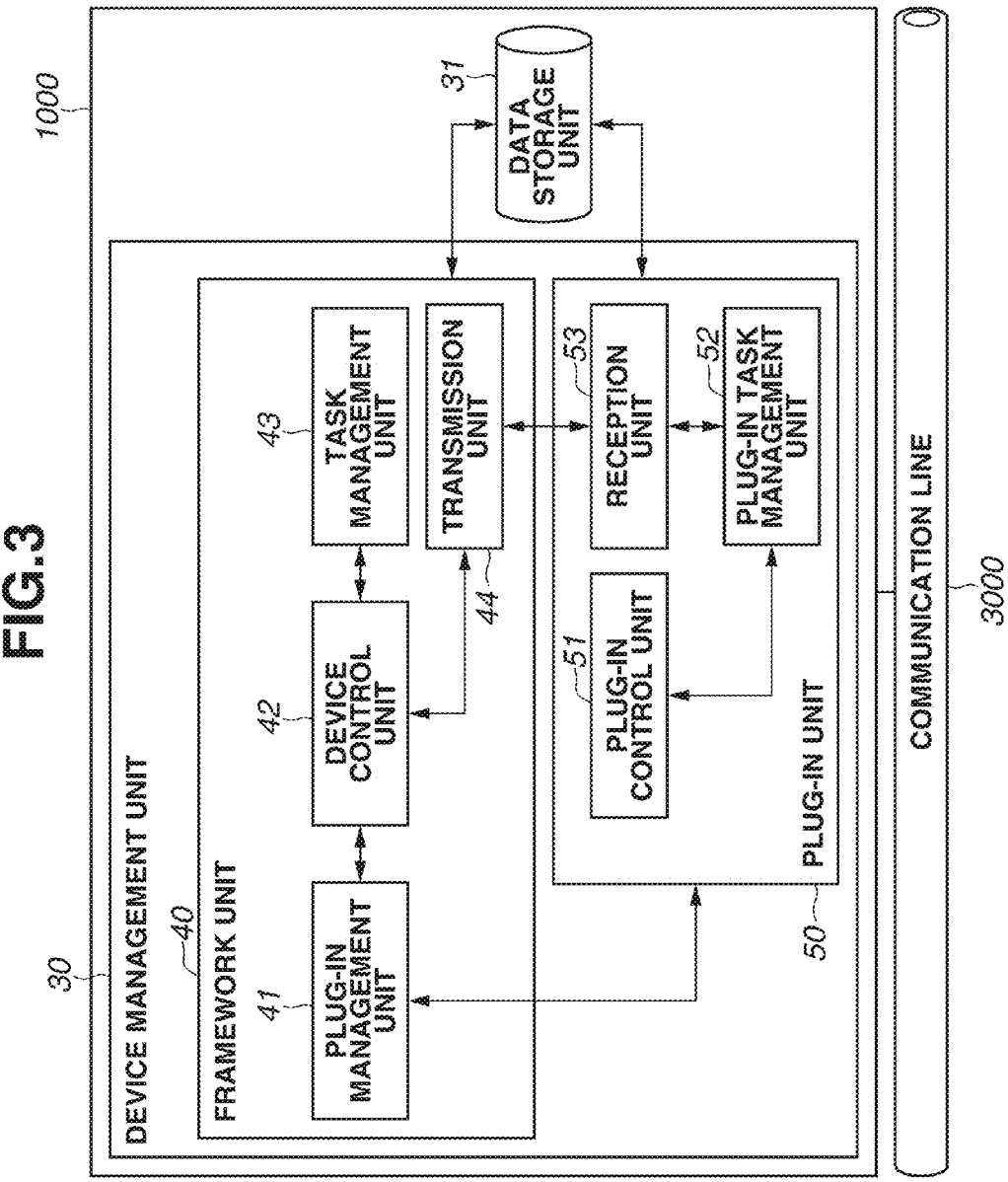
FIG. 3 is a block diagram illustrating an example of a software module configuration of the management apparatus according to an exemplary embodiment of the present invention.

The management apparatus 1000 is a server in which a device management unit 30 for managing the network devices 2000 illustrated in FIG. 3 operates, and may be implemented as a web service server. More specifically, a device management application executed by the management apparatus 1000 will operate as a web application. In this case, a user of a client apparatus (not illustrated) accesses a web service server (management apparatus 1000) by using a web browser operating on the client apparatus on the communication line 3000 to perform operations related to network device management processing. More specifically, the web browser displays a management screen (described below) provided by the management apparatus 1000, and the user operates the relevant management screen. Thus, the network devices management processing is performed by the management apparatus 1000.

Figure 2:
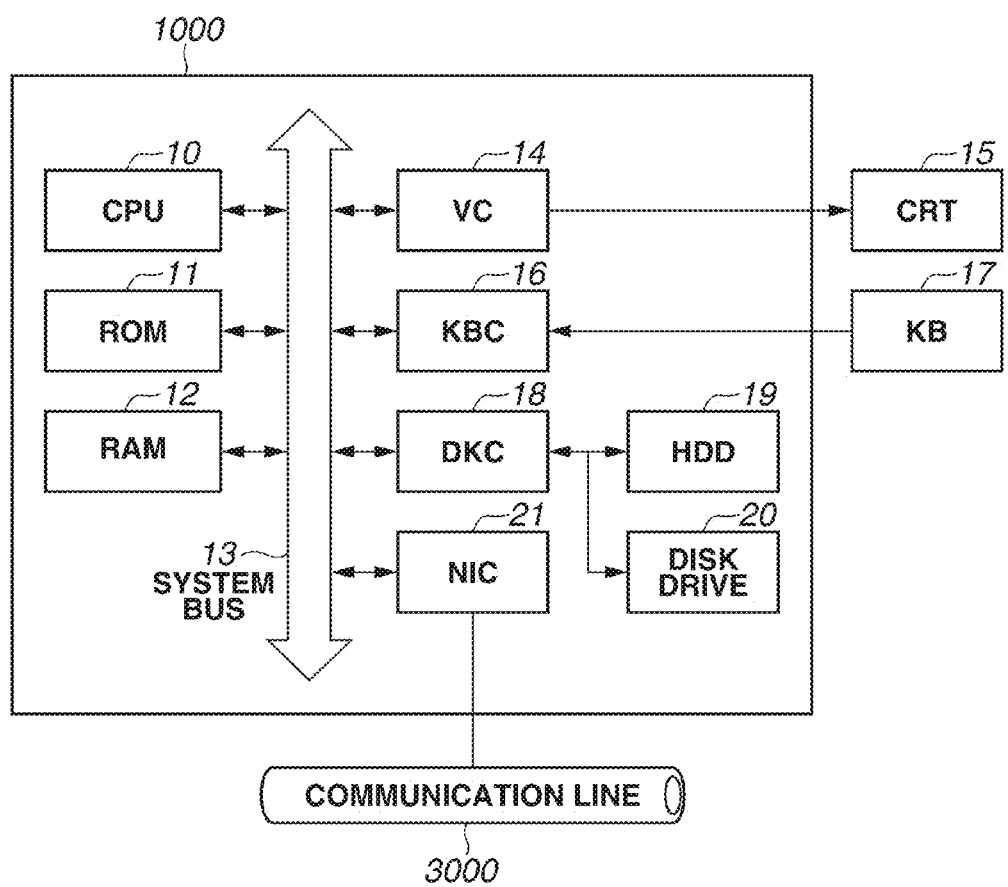
FIG. 2 is a block diagram illustrating an example of a hardware configuration of a management apparatus according to an exemplary embodiment of the present invention.

FIG. 2 illustrates an example of a hardware configuration of the management apparatus 1000.

A central processing unit (CPU) 10 executes various programs stored in a read only memory (ROM) 11 and a hard disk drive (HDD) 19 by using a random access memory (RAM) 12 as a work area. The device management unit 30 (described below) is also one of functions implemented when the CPU 10 executes one or more programs (device management application). For example, the device management application is supplied via a storage medium, such as a floppy disk (FD), a compact disc read only memory (CD-ROM), a digital versatile disc (DVD), a magnetic tape, and an integrated circuit (IC) memory card which can be mounted on disk drive 20. The CPU 10 displays a user interface on a display apparatus (such as a cathode ray tube (CRT)) 15 via a video card (VC) 14. The CPU 10 further performs control according to an instruction through the user interface input from a keyboard (KB) 17 via a keyboard controller (KBC) 16. In addition to the KB 17, instructions can be input by using a pointing device such as a mouse (not illustrated), and a touch panel. The CPU 10 executes data communication with the network devices 2000 on the communication line 3000 via a network interface board (NIC) 21.

FIG. 3 illustrates an example of a software module configuration of the management apparatus 1000. More specifically, FIG. 3 illustrates an example of a virtual module configuration to illustrate functions implemented by executing programs according to the present exemplary embodiment.

The device management unit 30 includes a framework unit 40 and one or more plug-in units 50. The management apparatus 1000 includes a data storage unit 31 which is shared by the framework unit 40 and the plug-in unit 50. Storage areas, such as the HDD 19, are used as the data storage unit 31.

The framework unit 40 includes a plug-in management unit 41, a device control unit 42, a task management unit 43, and a transmission unit 44.

The plug-in management unit 41 manages the addition and deletion of functions (services) to/from the device management application by plug-in programs. When a function (service) is added by the relevant plug-in program, the plug-in unit 50 illustrated in FIG. 3 will be added. Upon reception of an instruction for deleting a plug-in program from a user (network administrator) of the management apparatus 1000, the plug-in management unit 41 manages the deletion, activation, and deactivation of the plug-in unit 50.

The device control unit 42 controls the function of searching for a network device 2000 on the network, and the function of acquiring device information. In connection with these functions, the device control unit 42 can register a search task and a monitoring task in the data storage unit 31 as a type of remote tasks, and executes these tasks. Function information includes identification information (such as the Internet Protocol (IP) address), status information, function information, device configuration information of the network devices 2000. The device control unit 42 acquires the function information by using messages conforming to various network protocols. For example, the device control unit 42 acquires Management Information Base (MIB) information as device information.

Examples of network protocols include Simple Network Management Protocol (SNMP), Internet Protocol (IP) Broadcast, Service Location Protocol/Multicast (SLP/Multicast), and Web Services Description (WSD). The task management unit 43 controls the management and execution of remote tasks generated and registered in the data storage unit 31 by the device control unit 42. The task management unit 43 also performs display control of the display apparatus, such as display of management screens for changing and deleting remote tasks and display of execution results. The transmission unit 44 makes an update notification to the plug-in unit 50 according to the result of remote task execution.

The plug-in unit 50 includes a plug-in control unit 51, a plug-in task management unit 52, and a reception unit 53.

Examples of functions added to the device management application as the plug-in units 50 will be described below. These functions may be implemented as one plug-in unit 50. Further, plug-in programs may be configured so that these functions are implemented by one or more plug-in units 50.
(1) A function of distributing the firmware itself or information about the firmware to the network devices 2000, and instructing update.
(2) A function of acquiring or distributing detailed device settings (device configurations) of the network devices 2000.
(3) A function of distributing the device application itself or information about the device application to be executed on the network devices 2000, and instructing to set operations.
(4) A function of executing an authentication test on the network devices 2000.

Remote tasks generated by the above-described functions (1) to (3) based on the plug-in units 50 are referred to as regular tasks. On the other hand, a remote task generated by the function (4) is referred to as a one-shot task in the present exemplary embodiment. When the user presses a button arranged on a screen provided by the management apparatus 1000, one-shot tasks are generated and immediately executed, and execution results are obtained.

During execution of a remote task for an authentication test on the network devices 2000, which is an example of a one-shot task, operations on a screen provided by the management apparatus are locked since the time when the user presses a button on the screen until the time when it becomes possible to determine and make a notification of the execution result of the task. This aims to prevent the user from operating or executing other management functions until the authentication test is successfully completed. Further, after execution of a one-shot task, a timeout function is enabled on the assumption of a case where the result cannot be determined because of a network failure. If a predetermined time period has elapsed since the user presses the relevant button, the timeout function cancels the one-shot task currently being executed.

As another example of a one-shot task, there is a task for executing a communication test on a web service for managing the firmware of the network devices 2000. This type of task is a remote task generated by the plug-in unit 50 having at least the function (1). During execution of this remote task, operations on the relevant screen are locked until it becomes possible to determine and make a notification of the result of the communication test. The web service for managing the firmware may be implemented as a function of a server apparatus on the network different from the management apparatus 1000, or provided in the management apparatus 1000.

The plug-in unit 50 generates a special remote task for executing regular tasks related to the above-described functions (1) to (3). This special remote task is a task (hereinafter referred to as a sub search task) for investigating whether the network devices 2000 subjected to management by the device management unit 30 are provided with functions corresponding to these regular tasks. For example, upon reception of an instruction for updating the firmware, a sub search task for regular tasks related to the function (1) is generated and executed to determine whether a network device 2000 is provided with a function of applying the relevant firmware (device application). When a specific condition is satisfied, a sub search task is generated and executed by the plug-in unit 50 in the background without an instruction input from the user.

When a new network device 2000 is detected by a search task, or when the device configuration information of a management target network device 2000 is determined to have changed, a sub search task is generated and executed by the plug-in unit 50 in the background. In addition, for example, at the timing of the addition and start of the plug-in unit 50, a sub search task is generated and executed by the plug-in unit 50 in the background.

As described above, in addition to the above-described regular tasks, remote tasks for achieving the management of the network devices 2000 include sub search tasks and one-shot tasks which are auxiliary tasks for reliably executing regular tasks.

Upon reception of an update notification from the transmission unit 44 of the framework unit 40, the reception unit 53 internally instructs the plug-in task management unit 52 to execute a task. Examples of update notifications include a notification that a new network device 2000 is found and a notification about change in the device configuration information of a management target network device 2000. Thus, upon reception of such an update notification, the reception unit 53 instructs the plug-in task management unit 52 to generate and execute a sub search task.

The plug-in task management unit 52 controls execution of regular tasks and one-shot tasks specified to be executed by the plug-in control unit 51, and controls execution of sub search tasks specified to be executed by the reception unit 53. Remote tasks specified to be executed are once registered in the data storage unit 31 and sequentially executed. The plug-in task management unit 52 determines the execution priority of these remote tasks according to the task attribute of each of the registered remote tasks.

Processing relating to task control by the plug-in task management unit 52 will be described below with reference to FIGS. 4 to 7.

FIG. 4 illustrates an example of device information for each of the network devices 2000 (DevA1 to DevAx). Referring to FIG. 4, the device information includes the device name, the product name, the address information, the operating condition, and supported services. For example, a network device DevA1 has device name "DevA1", product name "DevA", and address information "IP_A1". Further, the network device DevA1 has operating condition "OPERATING", and supports services "sPIA to sPIX". The address information is, for example, the IP address for enabling communication with the framework unit 40 and the plug-in unit 50 of the device management unit 30. In the present exemplary embodiment, supported services indicate function information for supporting each function provided by the plug-in unit 50. For example, the service "sPIA" is a service for supporting the function of the plug-in A having the plug-in unit 50. This service may be provided as a function to be implemented by installing a device application in a network device 2000.

FIG. 5 is a table (device list) storing execution results of remote tasks generated and executed by the device control unit 42 of the framework unit 40. In this case, the executed remote tasks include the above-described search tasks and monitoring tasks. The device information to be stored in the table illustrated in FIG. 5 includes the device name, the product name, the address information, and the operating condition.

For example, device information acquired from the network device DevA1 through task execution includes device name "DevA1", product name "DevA", address information "IP_A1", and operating condition "OPERATING".

For remote tasks generated and executed by the device control unit 42, information about services supported by the network devices 2000 is not acquired. This is because it is not necessary to acquire information about functions related to plug-in programs which may or may not to be added. However, exceptionally, task control may be designed in such a way that the information about supported services is acquired by remote tasks generated and executed by the device control unit 42.

The device information illustrated in FIG. 5 may be implemented not only by executing remote tasks but also by importing a file storing these pieces of information to the device management unit 30.

The device control unit 42 is provided with a function of determining whether to instruct the transmission unit 44 to transmit an update notification, based on a predetermined condition. As described above, when a new network device 2000 is found as a result of network search or when information about the management target network device 2000 is specified to be deleted, the device control unit 42 of the framework unit 40 instructs the transmission unit 44 to transmit an update notification. It is possible to set other conditions under which the device control unit 42 instructs the transmission unit 44 to transmit an update notification. Examples of other conditions are:

A new network device 2000 is added by importing a file to the device management unit 30.

The device configuration information of an existing management target network device 2000 is changed.

The plug-in management unit 41 detects the addition of a new plug-in unit 50.

The above-described conditions may be set by the user using one of device management screens provided as functions of the framework unit 40, or by reading conditions defined in an external file referable to by the device control unit 42.

Regular tasks, one-shot tasks, and sub search tasks generated by the plug-in unit 50 will be described below on a supplementary basis.

A sub search task is a remote task for determining whether a network device 2000 supports the function provided by the plug-in unit 50. Therefore, it is desirable that the plug-in unit 50 executes sub search tasks before executing regular tasks and one-shot tasks.

Further, it is desirable that execution of sub search tasks is completed since the time when the plug-in unit 50 is added until the time of start processing in which the functions provided by the plug-in unit 50 are enabled. This is because, in this case, execution of regular tasks and one-shot tasks according to the results of sub search tasks is guaranteed at least for network devices 2000 initially subjected to management. Sub search tasks, as remote tasks, are generated for the number of network devices 2000 registered in the device list in the table illustrated in FIG. 5. In other words, the number of generated sub search tasks and the generation timing thereof are determined depending on the framework unit 40.

A device authentication task, an example of a one-shot task, is a remote task for performing in advance the device authentication required to execute regular tasks. A sub search task will perform the device authentication on network devices 2000 determined to support the functions provided by the plug-in unit 50. When the device authentication task is successfully executed, setting of the device authentication information can be omitted when the regular tasks are generated afterwards.

Regular tasks can be generated and executed by using execution results of not only sub search tasks but also one-shot tasks. Therefore, it is desirable to set a lower task execution priority to regular tasks than task execution priorities set to sub search tasks and one-shot tasks.

In the present exemplary embodiment, the priority of each of these tasks at the time of task execution control is determined in consideration of the characteristics of each of these tasks. More specifically, one-shot tasks are determined to have the "High" priority, sub search tasks are determined to have the "Middle" priority, and, regular tasks are determined to have the "Low" priority.

FIGS. 6A and 6B illustrate an example of task execution control by the plug-in task management unit 52 of the plug-in unit 50.

In FIGS. 6A and 6B, a plurality of remote tasks registered in the data storage unit 31 by the plug-in task management unit 52 is managed by using the execution waiting task queue and the executing task queue. Remote tasks stored in the executing task queue indicate that they are currently being executed on the network devices 2000. For example, the maximum number of tasks storable in the executing task queue is assumed to be 5. This means that up to 5 tasks can be executed in parallel by the plug-in unit 50. Each time processing of any one remote task in the executing task queue is completed, the tasks in the execution waiting task queue are sequentially stored in the executing task queue, starting from the first task. Unlike the example illustrated in FIGS. 6A and 6B, it is also possible to prepare an execution waiting task queue on a task priority basis and perform task management.

As illustrated in FIG. 6A, the execution waiting task queue manages regular tasks having the "Low" priority corresponding to the network devices DevA1 to DevAx and sub search tasks having the "Middle" priority corresponding to the network devices DevA6 to DevAx. Further, sub search tasks for the network devices DevA1 to DevA5 are currently being executed in the executing task queue.

It is assumed that, in this state, the plug-in task management unit 52 is instructed to execute two one-shot tasks for network devices DevAn and DevAm by the plug-in control unit 51. In this case, the plug-in task management unit 52 will determine the "High" priority about these one-shot tasks. As a result, as illustrated in FIG. 6B, the plug-in task management unit 52 queues two one-shot tasks into the execution waiting task queue so that they are executed in preference to the sub search tasks already managed in the execution waiting task queue. With this processing, the two one-shot tasks will be stored in the executing task queue and executed in preference to the existing sub search tasks in the execution waiting queue.

FIG. 7 illustrates various cases in which the plug-in task management unit 52 queues a new remote task into the execution waiting task queue.

The leftmost column indicates remote tasks already managed in the execution waiting task queue by the plug-in task management unit 52, and priorities of the remote tasks. The top row indicates a new remote task that the plug-in task management unit 52 is newly instructed to execute, and the priority of the new remote task.

The example illustrated in FIGS. 6A and 6B indicates a case where the plug-in task management unit 52 is instructed to execute the task D as a new task in the state of the 4th row illustrated in FIG. 7. FIG. 7 illustrates that the task D is queued before the existing execution waiting tasks.

In FIG. 7, when the plug-in task management unit 52 is instructed to execute the task D as a new task in the state of the 1st row, the task D is queued into the execution waiting task queue so as to be executed after the existing task A having the "High" priority.

Processing performed by the plug-in task management unit 52 will be described below with reference to the accompanying drawings.

FIG. 8A illustrates an example of a plug-in list stored in the data storage unit 31 by the plug-in management unit 41. The table illustrated in FIG. 8A includes status information of each plug-in, such as the plug-in name, the version, and the operating condition. For example, the table illustrates that the plug-in having plug-in name "PLUG-IN A" and version "v1.0.0" is operating. On the other hand, the plug-in having plug-in name "PLUG-IN B" and version "v2.1.0" is stopped.

Figure 9A:
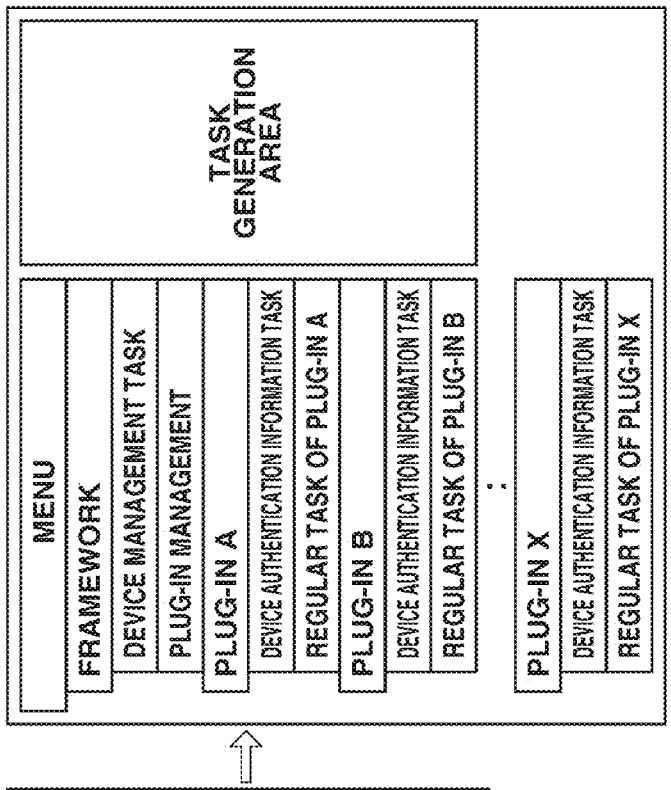
FIGS. 9A and 9B illustrate examples of management screens provided by a device management unit 30.
Figure 9B:
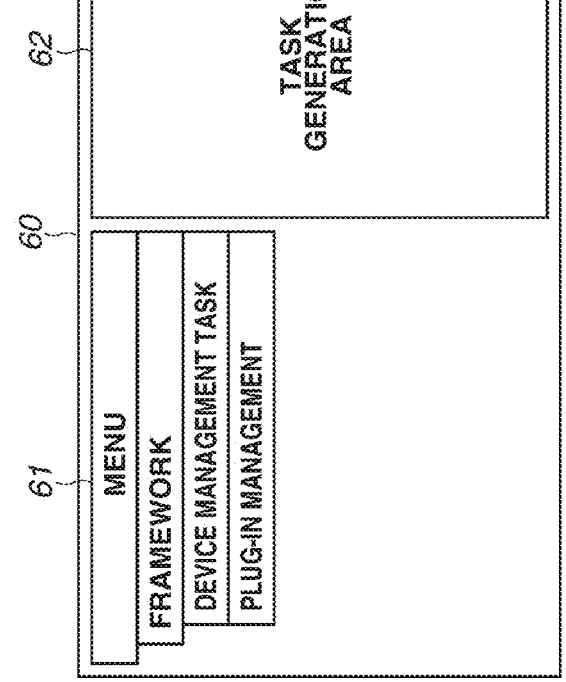

FIGS. 9A and 9B illustrate examples of management screens provided by the device management unit 30 implemented by the device management application. A management screen 60 includes a menu 61 and a task generation area 62. The device management unit 30 performs control to display a task generation screen in the task generation area 62 according to the menu 61 selected by the user via the management screen 60.

FIG. 9A illustrates a screen configuration in a case where the device management unit 30 includes only the framework unit 40. The menu 61 in this case includes "DEVICE MANAGEMENT TASK" for managing remote tasks in terms of the search function and the monitoring function provided by the framework unit 40, and "PLUG-IN MANAGEMENT" for managing the addition of plug-in programs. When the "DEVICE MANAGEMENT TASK" menu is selected, a regular task for searching for and monitoring network devices 2000 can be generated. When the "PLUG- IN MANAGEMENT" menu is selected, operations for adding, deleting, and activating/deactivating plug-ins can be specified.

FIG. 9B illustrates an example of a screen configuration when plug-ins A to X are added as the plug-in units 50. Referring to FIG. 9B, menu items for using the functions of the plug-in unit 50 of the plug-ins A to X are added. For example, for the plug-in A, when the "DEVICE AUTHENTICATION INFORMATION TASK" menu is selected, operations related to the generation of a device authentication task (one-shot task) can be performed. Further, the "REGULAR TASK OF PLUG-IN A" menu for generating a regular task specific to the plug-in A is also prepared.

Operations relating to the generation of a device authentication task (one-shot task) will be described below with reference to the accompanying drawings. When the "DEVICE AUTHENTICATION INFORMATION TASK" menu is selected, the plug-in control unit 51 acquires a support device list illustrated in FIG. 11 stored in the data storage unit 31. The plug-in control unit 51 further performs control to display a device authentication information setting screen in the task generation area 62 on the display apparatus.

FIG. 11 illustrates an example of a list of network devices 2000 (support device list) supporting the function provided by each plug-in program managed in the data storage unit 31 by the plug-in control unit 51 of each plug-in unit 50. The support device list includes device information, such as the device name, the product name, and the address information. The support device list is suitably updated by the plug-in control unit 51 according to the execution results of sub search tasks.

FIG. 12 illustrates an example of a device authentication information setting screen. This setting screen provides device information, authentication information, and authentication test information.

The "AUTHENTICATION INFORMATION" display portion includes columns "AUTHENTICATION METHOD", "DOMAIN NAME", "USER NAME", and "PASSWORD" to enable setting and editing the authentication information. The "AUTHENTICATION TEST" display portion includes an "AUTHENTICATE" button for executing the authentication test, and column "RESULT" for displaying the execution result. The authentication information set on this screen is information about authentication with an apparatus to be processed by remote tasks, to make successful regular tasks provided by each plug-in. This authentication information is preset in the network devices 2000 as target apparatuses.

The "DOMAIN AUTHENTICATION" method requires a domain name, a user name, and a password in authentication with network devices 2000. The "LOCAL DEVICE AUTHENTICATION" method requires a user name and a password. The authentication method is not limited to "DOMAIN AUTHENTICATION" and "LOCAL DEVICE AUTHENTICATION". The authentication method supported by apparatuses to be processed by remote tasks, such as the network devices 2000, can be flexibly set via the setting screen.

Further, the setting screen illustrated in FIG. 12 includes an "UPDATE" button for storing set and edited authentication information, and a "CANCEL" button for cancelling setting processing.

In the example illustrated in FIG. 12, the "DOMAIN AUTHENTICATION" method, domain name "DomainA", user name "UserA1", and password "123" are set by the user as the authentication information for the network device DevA1. The password is displayed as "000" to protect privacy. When the "AUTHENTICATE" button for the network device DevA1 is pressed, the plug-in control unit 51 instructs the plug-in task management unit 52 to execute the device authentication task. In this case, the screen itself is locked to prohibit user operations on the setting screen illustrated in FIG. 12. When the plug-in control unit 51 is notified of the result of task execution by the plug-in task management unit 52, the plug-in control unit 51 displays the result of one-shot task execution in column "RESULT" for "AUTHENTICATION TEST" illustrated in FIG. 12.

FIG. 13 illustrates an example of a device authentication information list stored in the data storage unit 31. In this list, device information such as the device name and the product name, and authentication information such as the authentication method, the domain name, the user name, and the password corresponding to the device information, is managed. When displaying the setting screen illustrated in FIG. 12, the device control unit 51 refers to the lists illustrated in FIGS. 11 and 13.

As a result of the above-described operations, the plug-in task management unit 52 is instructed to execute a device authentication task which is a one-shot task. Processing performed by the plug-in task management unit 52 according to this operation will be described in detail below with reference to FIG. 15.

The management of plug-in programs will be described below with reference to FIGS. 10A and 10B.

FIG. 10A illustrates an example of a plug-in management screen displayed in the task generation area 62 when the "PLUG-IN MANAGEMENT" menu is selected. The plug-in management unit 41 acquires the plug-in list illustrated in FIG. 8A stored in the data storage unit 31, and performs control to display the plug-in list in the task generation area 62. The "PLUG-IN MANAGEMENT" screen includes columns "PLUG-IN NAME", "VERSION", and "PLUG-IN STATUS" relating to added plug-in units 50.

The "PLUG-IN MANAGEMENT" screen also displays at least one of a "STOP" button and a "START" button as an instruction portion for controlling the plug-in status, and displays a "DELETE" button for instructing to delete the stopped plug-in unit 50. The "PLUG-IN MANAGEMENT" screen also displays an "ADD PLUG-IN" button for displaying a screen for adding a new plug-in program and an "END" button for ending the operation on the "PLUG-IN MANAGEMENT" screen.

When the "ADD PLUG-IN" button is selected, the "ADD PLUG-IN" screen illustrated in FIG. 10B is displayed. The "ADD PLUG-IN" screen displays an edit box for specifying a path and a file in which a plug-in program is stored. The "ADD PLUG-IN" screen further displays an "ADD" button for instructing to add a plug-in and a "CANCEL" button for canceling the processing. The information about the plug-in program specified to be added will be newly stored in the data storage unit 31 by the plug-in management unit 41. Upon reception of a sub search task execution end notification from the plug-in task management unit 52 of the plug-in unit 50 corresponding to the added plug-in program, the plug-in management unit 41 updates the information about the "PLUG-IN MANAGEMENT" screen and displays the "PLUG-IN MANAGEMENT" screen including a plug-in Y.

Figure 14:
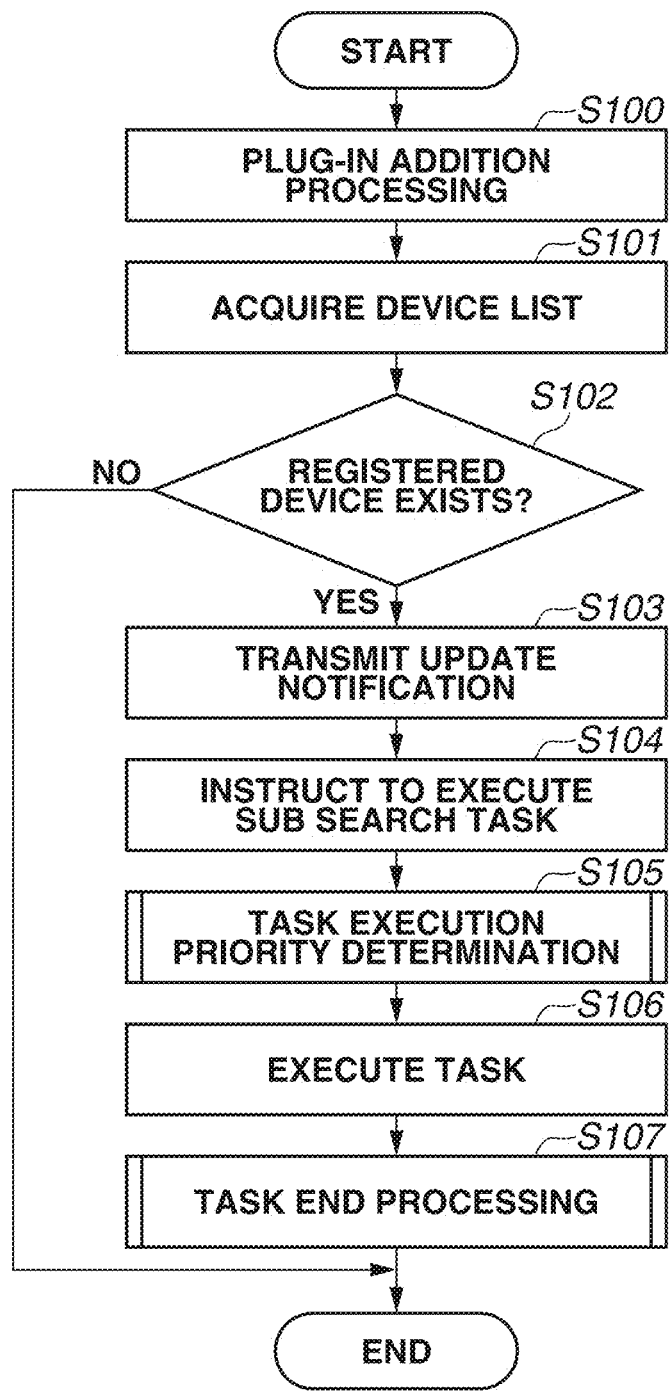
FIG. 14 is a flowchart illustrating details of plug-in addition processing.

FIG. 14 is a flowchart illustrating processing performed by the plug-in management unit 41 and the plug-in task management unit 52.

In step S100, upon reception of an operation for adding a specified plug-in program (plug-in unit 50), the plug-in management unit 41 performs addition processing. In step S101, the plug-in management unit 41 acquires a device list of monitoring target network devices 2000 stored in the data storage unit 31. Referring to the examples illustrated in FIGS. 10A and 10B, after the "ADD" button for the plug-in Y illustrated in FIG. 10B is pressed, the plug-in management unit 41 will acquire the device list illustrated in FIG. 5 from the data storage unit 31.

In step S102, the plug-in management unit 41 determines whether a target network device 2000 exists in the acquired device list. When the target network device 2000 is determined to exist (YES in step S102), the processing proceeds to step S103. On the other hand, when the target network device 2000 is determined not to exist (NO in step S102), the processing is terminated.

In step S103, the plug-in management unit 41 transmits an update notification according to the addition of a plug-in to the reception unit 53 of the added plug-in unit 50 via the transmission unit 44. In this case, the plug-in management unit 41 transmits an update notification to the reception unit 53 of the added plug-in unit 50 to execute sub search tasks for X network devices 2000 (DevA1 to DevAx). Update notifications for the number of devices including the device information illustrated in FIG. 5 may be transmitted. In this case, each time the notification is received, the plug-in unit 50 generates a sub search task for each target network device 2000.

In step S104, the reception unit 53 of the plug-in unit 50 instructs the plug-in task management unit 52 to generate and execute a sub search task according to the received update notification. In step S105, the plug-in task management unit 52 registers the generated sub search tasks for X network devices 2000 in the execution waiting task queue managed by the plug-in task management unit 52. Processing performed in step S105 will be described in detail below with reference to FIG. 15.

In step S106, the plug-in task management unit 52 sequentially moves remote tasks in the execution waiting task queue illustrated in FIGS. 6A and 6B to the executing task queue, and executes the remote tasks. In this case, X sub search tasks corresponding to the X network devices 2000 are sequentially executed. In step S107, the plug-in task management unit 52 executes the task end processing according to the execution result of each remote task executed in step S106. Processing performed in step S107 will be described in detail below with reference to FIG. 17.

According to the result of the task end processing, the plug-in management unit 41 stores the plug-in information of the plug-in unit 50 added to the plug-in list in the data storage unit 31. With this operation, the plug-in program addition processing ends.

Figure 15:
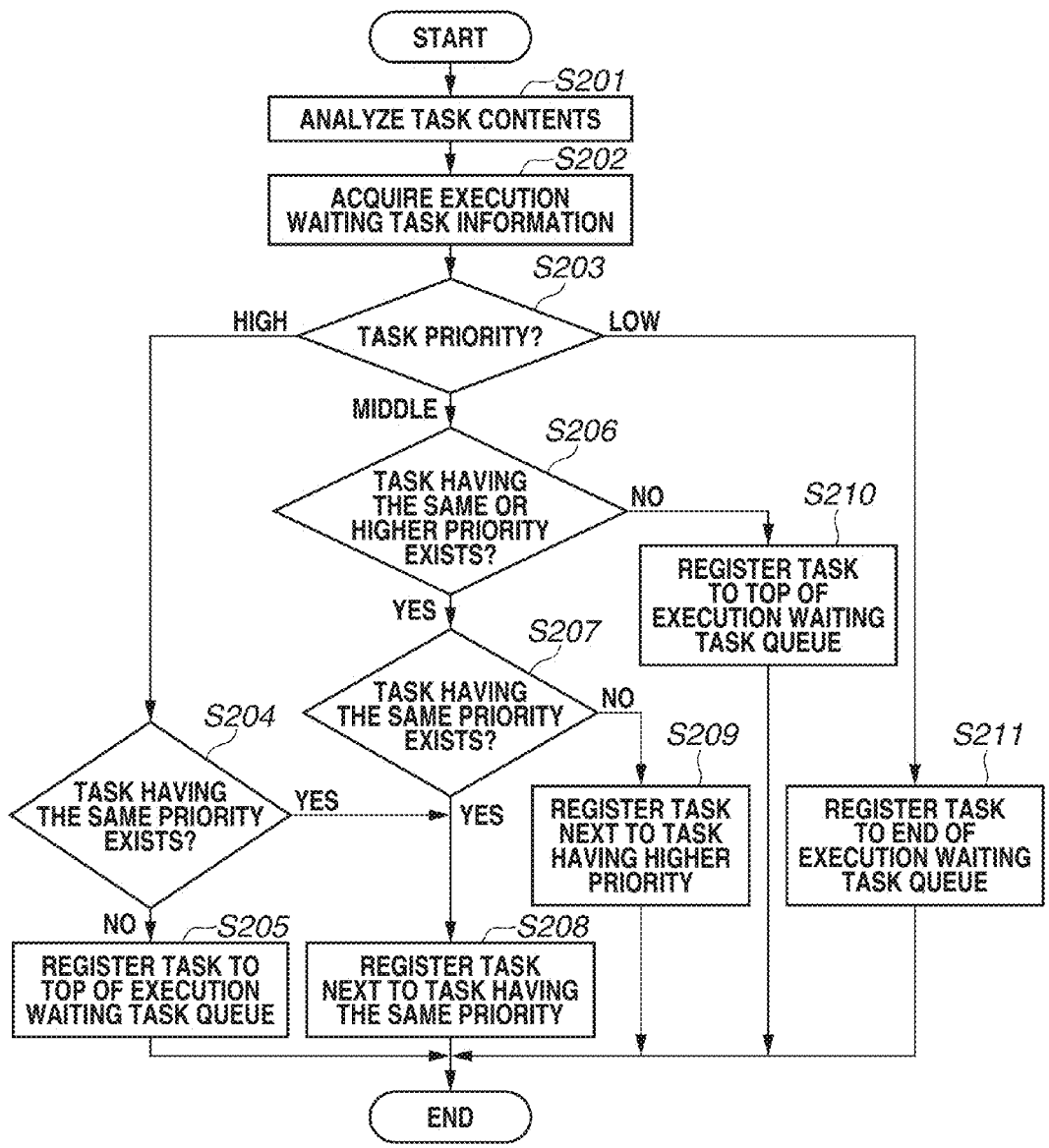
FIG. 15 is a flowchart illustrating details of processing performed by the plug-in task management unit 52 according to a first exemplary embodiment.

FIG. 15 is a flowchart illustrating in detail the processing performed by the plug-in task management unit 52 in step S105. This processing is performed not only in a case of plug-in addition as illustrated in FIG. 15 but also in a case of an operation for executing one-shot tasks and regular tasks via a management screen provided by the existing plug-in unit 50, and in a case where sub search tasks are specified to be executed under other conditions.

In step S201, the plug-in task management unit 52 analyzes the attribute of the remote task specified to be executed. More specifically, the plug-in task management unit 52 refers to the attribute of the remote task specified to be executed, and analyzes that the instruction source is the reception unit 53 and that the relevant remote task is not a remote task generated through an operation via a menu such as a management screen provided by the plug-in unit 50. The attribute of the remote task enables analyzing the information about the instruction source of execution. The attribute of the remote task also enables analyzing whether the relevant remote task was generated through an operation via a menu such as a management screen provided by the plug-in unit 50, and whether the relevant remote task is a remote task during which management screen operations are locked and the timeout processing is performed according to an execution instruction. The above-described analysis by the plug-in task management unit 52 is used to determine the priority of the remote task specified to be executed. However, it is also possible that, instead of setting such an attribute to the remote task, the priority is set to the remote task to be analyzed by the plug-in task management unit 52.

In step S202, the plug-in task management unit 52 acquires information about the remote tasks stored in the execution waiting task queue illustrated in FIGS. 6A and 6B. More specifically, the plug-in task management unit 52 acquires information about whether remote tasks are stored in the execution waiting task queue on a priority basis. In the example illustrated in FIG. 10B, since the plug-in task management unit 52 acquires information of the execution waiting task queue in relation to the plug-in Y which has been newly added, the plug-in task management unit 52 can determine that no remote task has been stored in the execution waiting task queue.

In step S203, the plug-in task management unit 52 determines the priority of the remote task specified to be executed. When the priority is determined to be "High" (High in step S203), the processing proceeds to step S204. When the priority is determined to be "Middle" (Middle in step S203), the processing proceeds to step S206. When the priority is determined to be "Low" (Low in step S203), the processing proceeds to step S211.

When the plug-in task management unit 52 is instructed to execute one-shot tasks in the example illustrated in FIG. 12, the priority is determined to be "High" in step S203, and the processing proceeds to step S204. The example illustrated in FIG. 10B indicates a case where the plug-in task management unit 52 is instructed to execute a sub search task accompanying the addition of the plug-in Y. In this case, the priority is determined to be "Middle" in step S203, and the processing proceeds to step S206.

In step S204, the plug-in task management unit 52 determines whether a remote task having the "High" priority exists in the remote tasks stored in the execution waiting task queue acquired in step S202. When the relevant remote task is determined to exist (YES in step S204), the processing proceeds to step S208. On the other hand, when the relevant remote task is determined not to exist (NO in step S204), the processing proceeds to step S205. In step S205, the plug-in task management unit 52 additionally registers the remote task presently specified to be executed at the top of the execution waiting task queue. When remote tasks having the "Middle" and "Low" priorities are stored in the execution waiting task queue, the remote task presently specified to be executed will be additionally registered before these tasks.

In step S208, the plug-in task management unit 52 identifies a remote task stored in the execution waiting task queue and registered as the last remote task having the same priority as the remote task presently specified to be executed, and then additionally registers the remote task presently specified to be executed so that it is to be executed next thereto. For example, assume a case where the remote task presently specified to be executed has the "High" priority, and remote tasks having the "High", "Middle", and "Low" priorities exist in the execution waiting task queue. In that case, the remote task presently specified to be executed will be additionally registered between the stored remote tasks having the "Middle" and "Low" priorities and the stored remote task having the "High" priority.

In step S206, the plug-in task management unit 52 determines whether a task having the "Middle" priority or higher exists in the remote tasks stored in the execution waiting task queue acquired in step S202. When the relevant task is determined to exist (YES in step S206), the processing proceeds to step S207. On the other hand, when the relevant task is determined not to exist (NO in step S206), the processing proceeds to step S210.

In step S207, the plug-in task management unit 52 determines whether a remote task having the "Middle" priority exists in the remote tasks stored in the execution waiting task queue acquired in step S202. When the relevant remote task is determined to exist (YES in step S207), the processing proceeds to step S208. On the other hand, when the relevant remote task is determined not to exist (NO in step S207), the processing proceeds to step S209. In step S209, the plug-in task management unit 52 identifies a remote task stored in the execution waiting task queue and registered as the last remote task having a higher priority than the remote task presently specified to be executed, and then additionally registers the remote task presently specified to be executed so that it is to be executed next thereto.

In step S210, the plug-in task management unit 52 additionally registers the remote task presently specified to be executed at the top of the execution waiting task queue. When remote tasks having the "Low" priority are stored in the execution waiting task queue, the remote task presently specified to be executed will be additionally registered before these tasks. In the example illustrated in FIG. 10B, the plug-in task management unit 52 registers at the top of the empty execution waiting task queue a sub search task targeting the first network device 2000.

In step S211, the plug-in task management unit 52 additionally registers, at the end of the execution waiting task queue, the remote task presently specified to be executed. This processing is performed when a regular task is specified to be executed by the plug-in control unit 51.

FIG. 17 is a flowchart illustrating details of remote task end processing in step S107 performed by the plug-in task management unit 52. This processing is performed not only in a case of plug-in addition as illustrated in FIG. 15 but also in a case of an operation for executing one-shot tasks and regular tasks via a management screen provided by the existing plug-in unit 50, and in a case where sub search tasks are specified to be executed under other conditions.

In step S300, the plug-in task management unit 52 analyzes the device information of the network device 2000 to be processed by the remote task executed in step S106, the success or failure of the remote task, and the task attribute of the executed remote task. When analyzing the execution result of the sub search task according to the addition of the plug-in Y illustrated in FIG. 10B, the plug-in task management unit 52 refers to the device information acquired from the target network device 2000 and information about whether the service "sPIY" supported by the plug-in Y is operating. When the service "sPIY" is operating, the plug-in task management unit 52 analyzes that the sub search task is successfully executed.

In step S301, the plug-in task management unit 52 determines the type of the executed remote task. When the type of the executed remote task is determined to be a sub search task (SUB SEARCH TASK in step S301), the processing proceeds to step S302. On the other hand, when the type of the executed remote task is determined to be a one-shot task (ONE-SHOT TASK in step S301), the processing proceeds to step S307. When the type of the executed remote task is determined to be a regular task (REGULAR TASK in step S301), the processing proceeds to step S309.

In step S302, the plug-in task management unit 52 determines whether the network device 2000 to be processed by the sub search task is a support device of which the supported service is operating. When the relevant network device 2000 is determined to be a support device (YES in step S302), the processing proceeds to step S303. On the other hand, when the relevant network device 2000 is determined to be not a support device (NO in step S302), the processing proceeds to step S304.

In step S303, the plug-in task management unit 52 requests the plug-in control unit 51 to register in the support device list in the data storage unit 31 (FIG. 11) the device information of the network device 2000 to be processed by the sub search task.

In step S304, the plug-in task management unit 52 requests the plug-in control unit 51 to delete from the support device list in the data storage unit 31 (FIG. 11) the device information of the network device 2000 to be processed by the sub search task. In step S305, the plug-in task management unit 52 determines whether the device authentication information of the network device 2000 to be processed by the sub search task exists in the device authentication information list in the data storage unit 31 (FIG. 13). When the relevant device authentication information is determined to exist (YES in step S305), the processing proceeds to step S306. On the other hand, when the relevant device authentication information is determined not to exist (NO in step S305), the processing proceeds to step S309. In step S306, the plug-in task management unit 52 requests the plug-in control unit 51 to delete the relevant device authentication information from the device authentication information list.

In step S307, the plug-in task management unit 52 determines whether the one-shot task is successful or failed. In a case of a device authentication task, the one-shot task is determined to be successful when authentication processing with the network device 2000 to be processed by the relevant device authentication task is successfully executed. When the one-shot task is determined to be successful (YES in step S307), the processing proceeds to step S308. On the other hand, when the one-shot task is determined to be failed (NO in step S307), the processing proceeds to step S309. In step S308, the plug-in task management unit 52 requests the plug-in control unit 51 to register, in the data storage unit 31, the information confirmed through the success of the one-shot task. In a case of a device authentication task, the plug-in control unit 51 will register, in the device authentication information list in the data storage unit 31 (FIG. 13), the authentication information of the network device 2000 to be processed by the relevant device authentication task and the device information used for task execution.

In step S309, the plug-in task management unit 52 notifies the plug-in management unit 41 of the completion of the remote task end processing together with information about the success or failure of the relevant task. For example, when the device authentication task is analyzed to be successful as a one-shot task, "OK" is displayed in the "RESULT" column of "AUTHENTICATION TEST" in the setting screen illustrated in FIG. 12. Accordingly, operations on the management screen are unlocked.

A second exemplary embodiment includes further improved example of processing than the processing illustrated in FIG. 17.

The present exemplary embodiment premises that the device authentication information used in a certain plug-in unit 50 can be utilized by a plurality of other plug-in units 50. Further, it is also premised that some plug-in units 50 have a device authentication function and others do not.

According to the processing illustrated in FIG. 17, when a sub search task is executed by a certain plug-in unit 50, the plug-in control unit 51 deletes the device authentication information stored in relation to a network device 2000 determined not to be a support device. However, taking the above-described premise into consideration, when another plug-in unit 50 exists, the relevant device authentication information may be used by the relevant another plug-in unit 50, and it is not necessary to delete it.

FIG. 18 illustrates a modification of the processing illustrated in FIG. 17 taking the above-described premise into consideration. The flowchart illustrated in FIG. 18 differs from the flowchart in FIG. 17 in that steps S400 and S401 are added thereto. For the processing already described with reference to FIG. 17, redundant description will be omitted.

In step S400, the plug-in task management unit 52 acquires the plug-in list in the data storage unit 31 illustrated in FIG. 8B.

FIG. 8B illustrates an example of a plug-in list stored in the data storage unit 31 by the plug-in management unit 41. This list includes item columns for each plug-in such as "PLUG-IN NAME", "VERSION", "PLUG-IN STATUS" indicating the operating condition, and "DEVICE AUTHENTICATION" indicating whether the device authentication function is supported.

For example, the plug-in A has plug-in name "PLUG-IN A", version "v1.0.0", and operating condition "OPERATING", and supports the device authentication function. The plug-in supporting the device authentication function has a "DEVICE AUTHENTICATION INFORMATION TASK" menu as one of menus, as illustrated in FIG. 9B.

In step S401, the plug-in task management unit 52 determines whether a plug-in having the device authentication function exists in the plug-in list acquired in step S400. When the relevant plug-in is determined to exist (YES in step S401), the processing proceeds to step S309. On the other hand, when the relevant plug-in is determined not to exist (NO in step S401), the processing proceeds to step S306. In step S306, the plug-in task management unit 52 will delete the relevant device authentication information from the device authentication information list.

In the present exemplary embodiment, only when there are no other plug-ins using the device authentication information than the relevant plug-in, the device authentication information of the network device 2000 identified to be not a support device by the sub search task will be deleted.

A third exemplary embodiment includes a further improved example of processing than the processing illustrated in FIG. 15.

There is a case where, when a certain plug-in unit 50 is instructed to execute a one-shot task, a sub search task for the target network device 2000 has not yet been executed. This means that the one-shot task is specified to be executed while the sub search task for the target network device 2000 is waiting in the execution waiting task queue.

In this case, for example, after the one-shot task for device authentication is successfully executed, the sub search task is executed and the target network device 2000 no longer is a support device. This is a case where the supported service is stopped or not installed although the authentication information has been set to the target network device 2000. In this case, the device authentication task of a network device 2000 which is not a support target will be executed, which is not necessary at least for the relevant plug-in unit 50. This may lead the plug-in control unit 51 to register unnecessary information in the device authentication information list in the data storage unit 31 (FIG. 13).

Therefore, for example, when the plug-in task management unit 52 is instructed to execute a one-shot task while a sub search task having the same processing target is waiting in the execution waiting task queue, it is desirable to control execution of the one-shot task based on the execution result of the sub search task.

As described according to the second exemplary embodiment, taking into consideration a case where the device authentication information is shared and used by a plurality of plug-in units 50, it may not be useless even if a one-shot task is executed before a sub search task.

Figure 16:
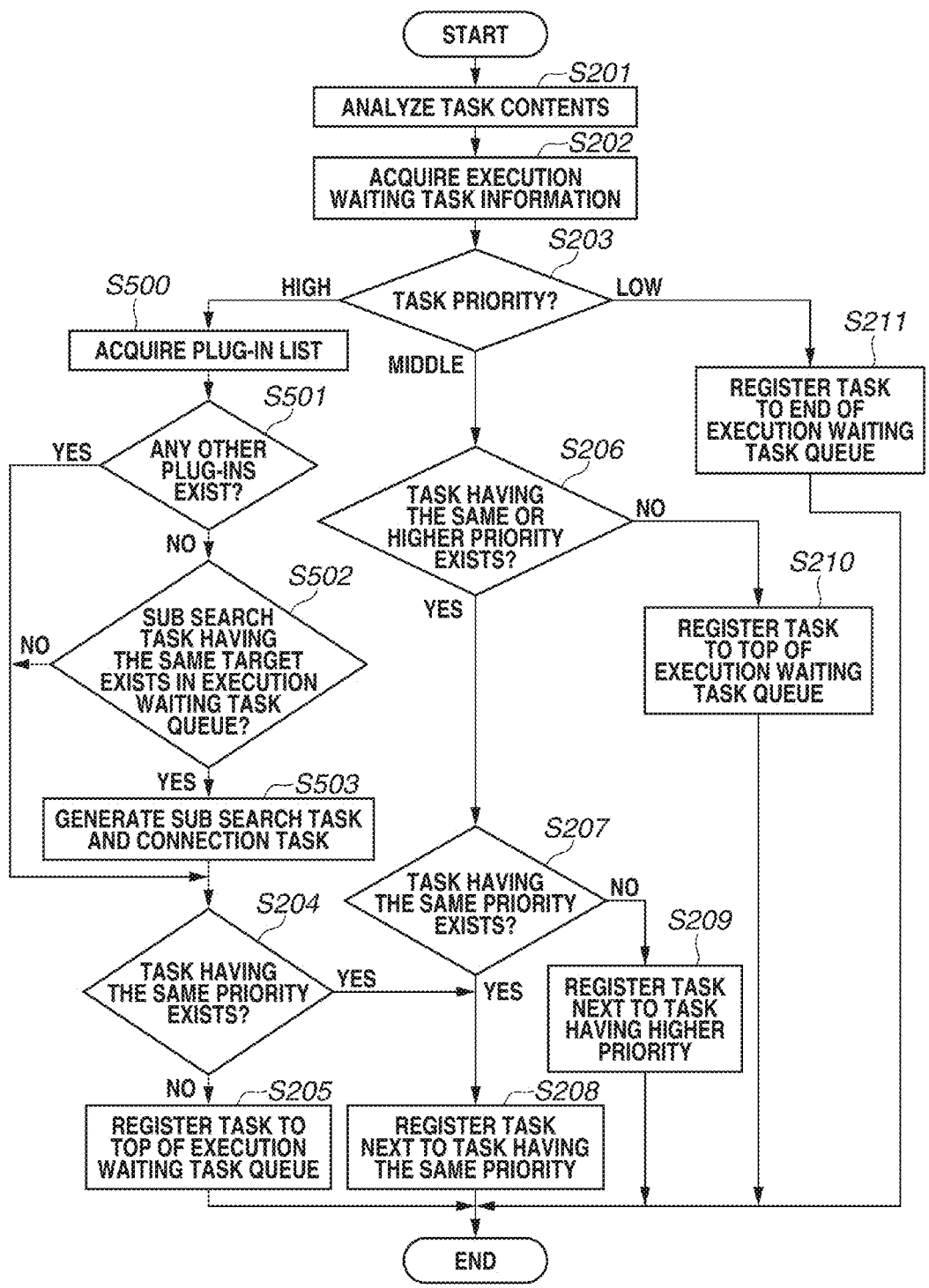
FIG. 16 is a flowchart illustrating details of processing performed by the plug-in task management unit 52 according to a third exemplary embodiment.

FIG. 16 illustrates a modification of the processing illustrated in FIG. 15 taking the above-described case into consideration. The flowchart illustrated in FIG. 16 differs from the flowchart in FIG. 15 in that steps S500 to S502 are added thereto. For the processing illustrated in FIG. 15, redundant description will be omitted.

In step S500, the plug-in task management unit 52 acquires the plug-in list illustrated in FIG. 8A in the data storage unit 31. In step S501, the plug-in task management unit 52 determines whether any other plug-in units 50 exist in the plug-in list acquired in step S500. When any other plug-ins are determined not to exist (NO in step S501), the processing proceeds to step S502. On the other hand, when any other plug-ins are determined to exist (YES in step S501), the processing proceeds to step S204.

In step S502, the plug-in task management unit 52 determines whether a sub search task targeting the network device 2000 to be processed by the remote task having the "High" priority already exists in the execution waiting task queue illustrated in FIGS. 6A and 6B. When the relevant sub search task is determined to exist (YES in step S502), the processing proceeds to step S503. On the other hand, when the relevant sub search task is determined not to exist (NO in step S502), the processing proceeds to step S204.

In step S503, the plug-in task management unit 52 generates a connection task having the "High" priority for connecting the remote task having the "High" priority and the relevant sub search task. This connection task is a task for continuously executing the remote task having the "High" priority and the relevant sub search task on the same network device 2000. For example, when a connection task is generated by a sub search task and a device authentication task, the relevant sub search task registered in the execution waiting task queue is deleted. When the execution result of the sub search task is failed as a result of connection task execution, the device authentication task for the target network device 2000 is canceled. In step S204 and subsequent steps, processing is continued for this connection task.

Control according to the present exemplary embodiment enables preventing useless one-shot task execution.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-257162 filed Dec. 12, 2013, which is hereby incorporated by reference herein in its entirety.

What is claimed is:

1. A management apparatus comprising,
a memory storing instructions related to a management application for managing network devices on a network; and
a processor which is capable of executing the instructions causing the management apparatus to:
generate, as a function of a plug-in for adding a service to the management application, a first task which is a remote task for determining whether the network devices support the service provided by the plug-in;
generate, as a function of the plug-in, a second task which is a remote task specified to be executed by a user operation performed via a management screen provided by the plug-in, and which is a remote task having a higher priority than the first task;
generate, as a function of the plug-in, a third task which is a remote task having a lower priority than the first task;
register, in an execution waiting task queue, the remote tasks generated by the plug-in according to the priorities of the remote tasks; and
execute, as a function of the plug-in, the first one of the remote tasks registered in the execution waiting task queue,
wherein, when the second task is specified to be executed via the management screen provided by the plug-in, display control is performed to disable operations via the management screen since a time when the execution is specified by the user until a time when the second task is executed and the execution result is analyzed by the plug-in.

2. The management apparatus according to claim 1, wherein the first task is generated upon reception, from the management application to the plug-in, of at least one of a notification that the plug-in is added to the management application, a notification that a target network device is added, and a notification when the configuration information of the target network device is changed.

3. The management apparatus according to claim 1, wherein the third task is a remote task for executing a service to be added by the plug-in on the network device according to a user operation via the management screen provided by the plug-in.

4. The management apparatus according to claim 1,
wherein the instructions cause the management apparatus to, when the execution result of the first task executed by the plug-in is successful, register the device information of the network device to be processed by the first task as a support device corresponding to the service provided by the plug-in, and
wherein, when the execution result of the first task executed by the plug in is failed and the network device to be processed by the first task is registered as a support device, the device information registered as the support device is deleted.

5. The management apparatus according to claim 1, wherein, in a case where the first task targeting the same network device is registered in the execution waiting task queue when registering a second task, a connection task for continuously executing the first and second tasks according to the same priority as the second task is registered in the execution waiting task queue, and
wherein the first task registered in the execution waiting task queue is deleted.

6. The management apparatus according to claim 1, wherein the second task is a remote task for performing authentication on each network device by using the authentication information input by the user.

7. The management apparatus according to claim 2, wherein the first task is a remote task generated without an execution instruction from the user via a management screen.

8. The management apparatus according to claim 4, wherein, when the execution result of the first task executed by the plug in is failed and the network device to be processed by the first task is registered as a support device, the authentication information stored in relation to the target network device is further deleted.

9. The management apparatus according to claim 8, wherein, when no other plug-ins using the authentication information than the plug-in are added to the management application, the authentication information is deleted.

10. A method for a management apparatus configured to execute a management application for managing network devices on a network, the method comprising:
generating as a first generation, as a function of the plug-in for adding a service to the management application, a first task which is a remote task for determining whether the network devices support the service provided by the plug-in;
generating as a second generation, as a function of the plug-in, a second task which is a remote task specified to be executed according to a user operation performed via a management screen provided by the plug-in, and which is a remote task having a higher priority than the first task;
generating as a third generation, as a function of the plug-in, a third task which is a remote task having a lower priority than the first task;
registering in the execution waiting task queue the remote task generated, as a function of the plug-in, by at least one of the first, the second, and the third generations according to the priority of the remote task; and
sequentially executing, as a function of the plug-in, a first one of the remote tasks registered in the execution waiting task queue, wherein, when the second task is specified to be executed via the management screen provided by the plug-in, display control is performed to disable operations via the management screen since a time when an execution is specified by the user until a time when the second task is executed and the execution result is analyzed by the plug-in.

11. A non-transitory computer readable storage medium on which is stored a computer program for making a computer execute a method for a management apparatus configured to execute a management application for managing network devices on a network, the method comprising:

generating as a first generation, as a function of the plug-in for adding a service to the management application, a first task which is a remote task for determining whether the network devices support the service provided by the plug-in;

generating as a second generation, as a function of the plug-in, a second task which is a remote task specified to be executed according to a user operation performed via a management screen provided by the plug-in, and which is a remote task having a higher priority than the first task;

generating as a third generation, as a function of the plug-in, a third task which is a remote task having a lower priority than the first task;

registering in the execution waiting task queue the remote task generated, as a function of the plug-in, by at least one of the first, the second, and the third generations according to the priority of the remote task; and sequentially executing, as a function of the plug-in, a first one of the remote tasks registered in the execution waiting task queue, wherein, when the second task is specified to be executed via the management screen provided by the plug-in, display control is performed to disable operations via the management screen since a time when an execution is specified by the user until a time when the second task is executed and the execution result is analyzed by the plug-in.

* * * * *